(12) United States Patent
Breen et al.

(10) Patent No.: US 7,962,420 B2
(45) Date of Patent: Jun. 14, 2011

(54) INFORMATION HANDLING SYSTEM INCLUDING BATTERY ASSEMBLY HAVING MULTIPLE SEPARABLE SUBASSEMBLIES

(75) Inventors: John J. Breen, Harker Heights, TX (US); Jay L. Taylor, Georgetown, TX (US); Chris Young, Austin, TX (US); Bruce Miller, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 1175 days.

(21) Appl. No.: 11/627,782

(22) Filed: Jan. 26, 2007

(65) Prior Publication Data

US 2008/0155811 A1    Jul. 3, 2008

Related U.S. Application Data

(62) Division of application No. 10/721,450, filed on Nov. 25, 2003, now abandoned.

(51) Int. Cl.
G06Q 30/00    (2006.01)
(52) U.S. Cl. ....................................................... 705/330
(58) Field of Classification Search .................... 705/330
See application file for complete search history.

(56) References Cited

U.S. PATENT DOCUMENTS

| | | | |
|---|---|---|---|
| 4,924,246 A | 5/1990 | Yamada | |
| 5,140,744 A | 8/1992 | Miller | |
| 5,532,524 A | 7/1996 | Townsley et al. | |
| 5,628,054 A | 5/1997 | Osaka | |
| 5,955,867 A | 9/1999 | Cummings et al. | |
| 6,211,645 B1 | 4/2001 | Kouzu et al. | |
| 6,340,311 B1 | 1/2002 | Hamada et al. | |
| 6,551,740 B1 | 4/2003 | Melichar | |
| 2003/0167244 A1 | 9/2003 | Rasmussen et al. | |
| 2004/0041537 A1* | 3/2004 | Ishida et al. | 320/107 |
| 2004/0219422 A1* | 11/2004 | Hauck et al. | 429/96 |
| 2005/0112457 A1 | 5/2005 | Breen et al. | |

OTHER PUBLICATIONS

Gurries, Mark, and Skovmand, Timothy J., "Reap Benefits While Simplifying Dual-Battery Portable Power Management," EDN, Feb. 16, 1998, pp. 117-118, 120, 122, 124, and 126.*

* cited by examiner

Primary Examiner — John W Hayes
Assistant Examiner — Nathan Erb
(74) Attorney, Agent, or Firm — Haynes and Boone, LLP

(57) ABSTRACT

A method for shipping a battery assembly includes providing a plurality of battery subassemblies. The plurality of battery subassemblies are operable to be mechanically and electrically connected together to form a battery assembly. The battery subassemblies are provided to be shipped such that an additional shipping fee that would be incurred due to a battery characteristic that is not based on the weight of the battery assembly is not incurred. The method includes shipping a first battery subassembly and a second battery subassembly such that the additional shipping fee that would be incurred due to the battery characteristic that is not based on the total weight of the battery assembly is not incurred.

19 Claims, 8 Drawing Sheets

INFORMATION HANDLING SYSTEM INCLUDING BATTERY ASSEMBLY HAVING MULTIPLE SEPARABLE SUBASSEMBLIES

CROSS-REFERENCE TO RELATED APPLICATIONS

This application claims priority to and is a divisional of co-owned co-pending U.S. patent application Ser. No. 10/721,450 filed Nov. 25, 2003, incorporated herein by reference in its entirety.

BACKGROUND

The disclosures herein relate generally to information handling systems and more particularly to battery assemblies which can be used in such systems and other devices requiring portable electrical power.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Portable battery-powered IHSs continue to progress with ever increasing information handling capabilities. However, concurrent with this performance increase, the amount of power which portable IHSs draw from their power supply systems continues to increase as well. Batteries are called upon to produce higher amounts of electrical energy with each new portable IHS generation. New regulatory requirements have dramatically increased the shipping charges for batteries which exceed certain thresholds, for example a power capacity of more than approximately 98 watt hours or a lithium content of more than 8 grams for lithium ion battery chemistry. Because batteries with capacities in excess of 98 watt hours are now needed to power today's high performance portable IHSs, the fees paid for shipping batteries are increasing substantially.

What is needed is a way to package batteries in a manner which results in more cost effective shipping for batteries with high watt hour ratings.

SUMMARY

Accordingly, in one embodiment, a method for shipping a battery assembly is disclosed. The method includes providing a plurality of battery subassemblies. The plurality of battery subassemblies are operable to be mechanically and electrically connected together to form a battery assembly. The battery subassemblies are provided to be shipped such that an additional shipping fee that would be incurred due to a battery characteristic that is not based on the weight of the battery assembly is not incurred. The method includes shipping a first battery subassembly and a second battery subassembly such that the additional shipping fee that would be incurred due to the battery characteristic that is not based on the total weight of the battery assembly is not incurred.

A principal advantage of the embodiments disclosed herein is that battery subassemblies can be shipped at significantly lower cost than batteries which exceed certain regulatory thresholds.

DETAILED DESCRIPTION

Figure 1:
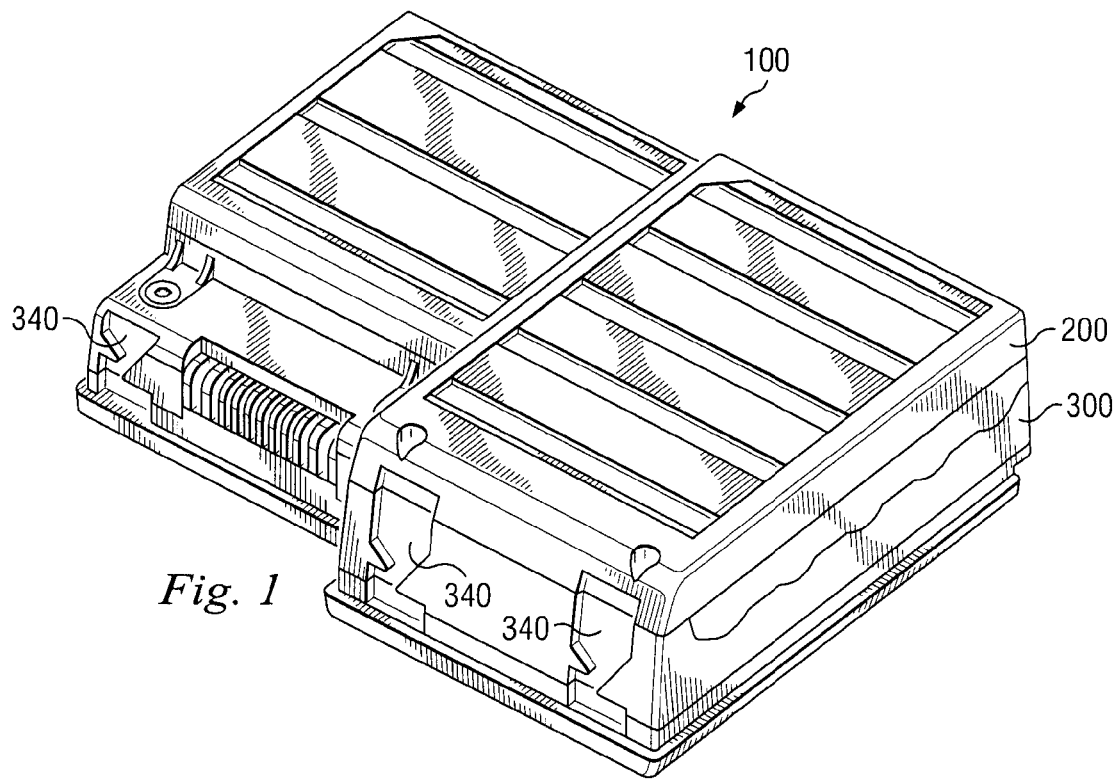
FIG. 1 is a perspective view illustrating an embodiment of the disclosed battery assembly.

FIG. 1 is a top perspective view of a battery 100 which can be used to supply power to an IHS or other electrical devices. For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 2:
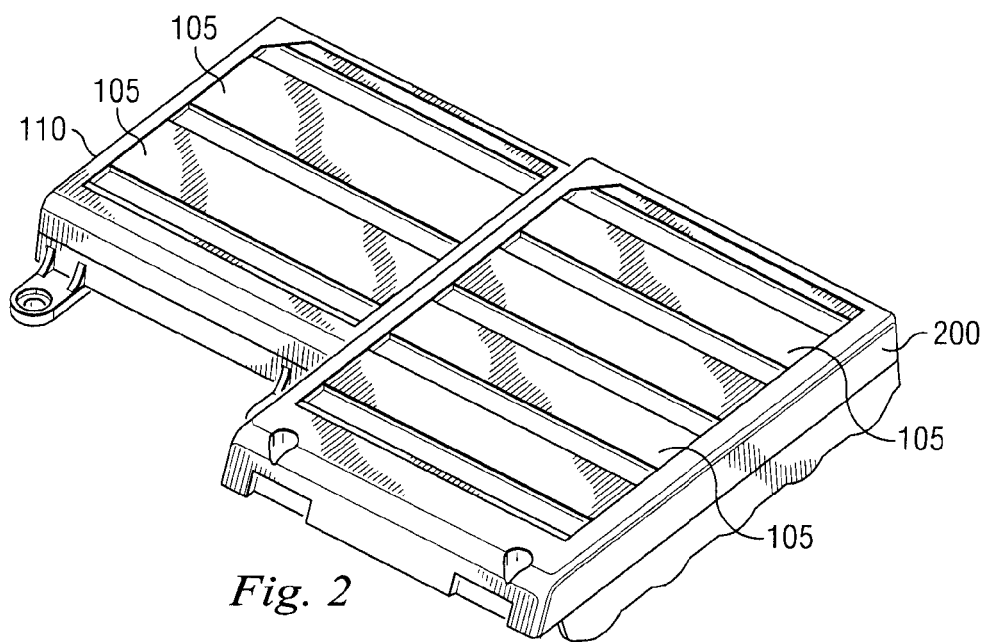
FIG. 2 is a perspective view of the upper battery subassembly of the battery assembly of FIG. 1.
Figure 3:
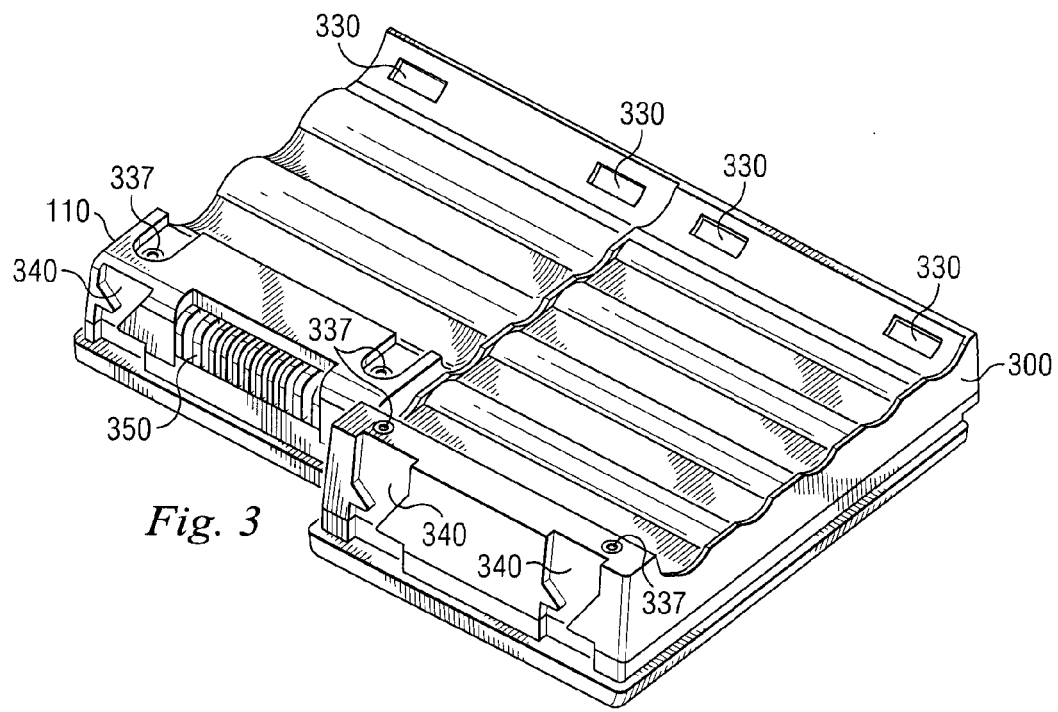
FIG. 3 is a perspective view of the lower battery subassembly of the battery assembly of FIG. 1.

In one embodiment, battery assembly 100 is formed from 2 or more battery subassemblies. In this manner, the power capacity of each battery subassembly can be made to be less than the threshold power capacity or threshold chemical mass at which increased shipping rates begin to apply. For example, in FIG. 1 battery assembly 100 includes an upper battery sub-assembly 200 which mechanically mates and electrically connects with a lower battery subassembly 300. A perspective view of upper battery subassembly 200 is shown in FIG. 2 and a perspective view of lower battery subassembly 300 is shown in FIG. 3.

Figure 4A:
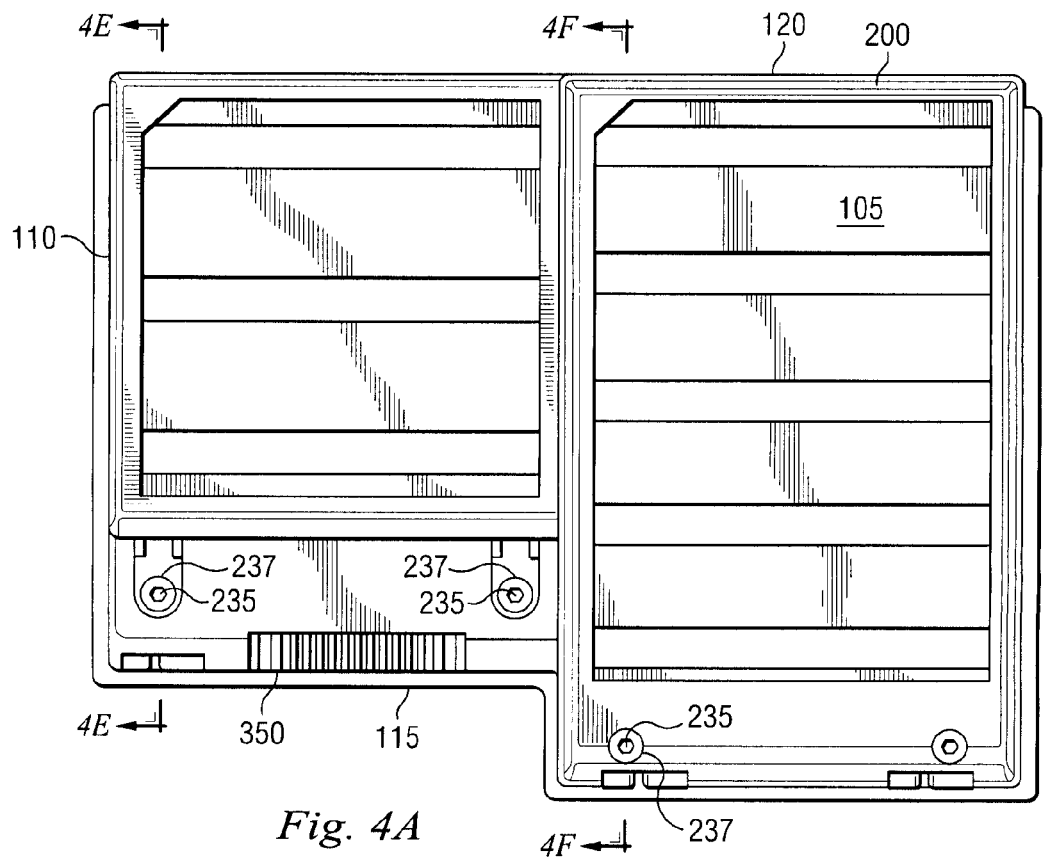
FIG. 4A-4F show several views illustrating an embodiment of the disclosed battery assembly.
Figure 4B:
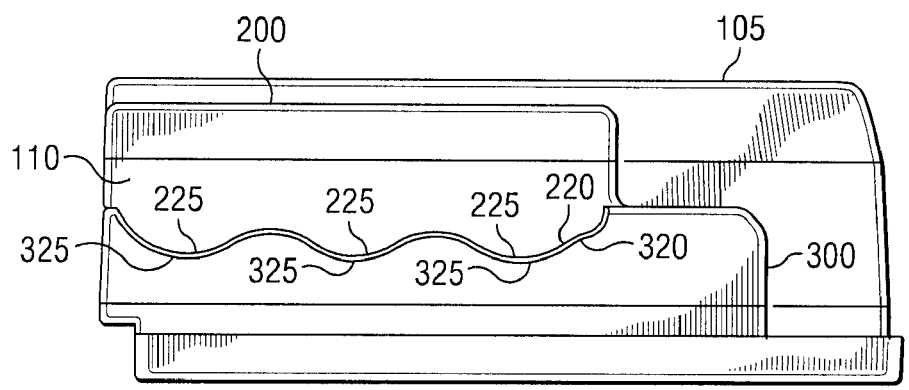
Figure 4C:
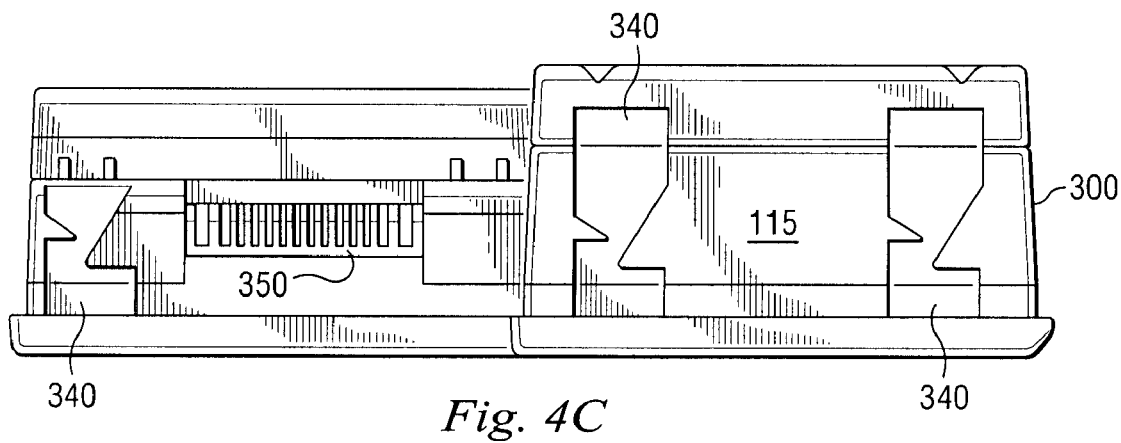
Figure 4D:
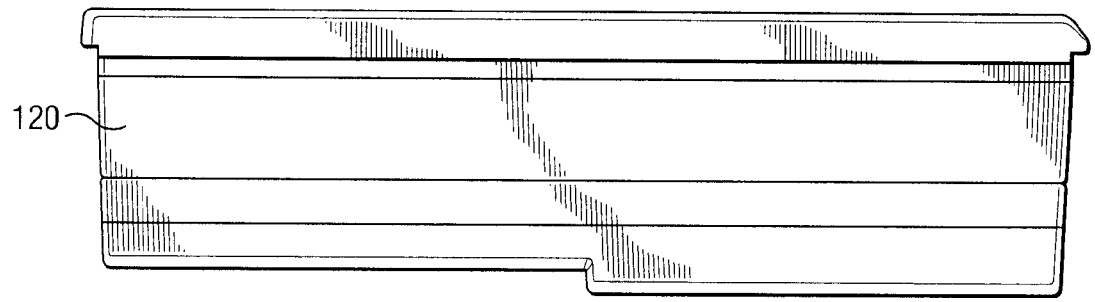
Figure 4E:
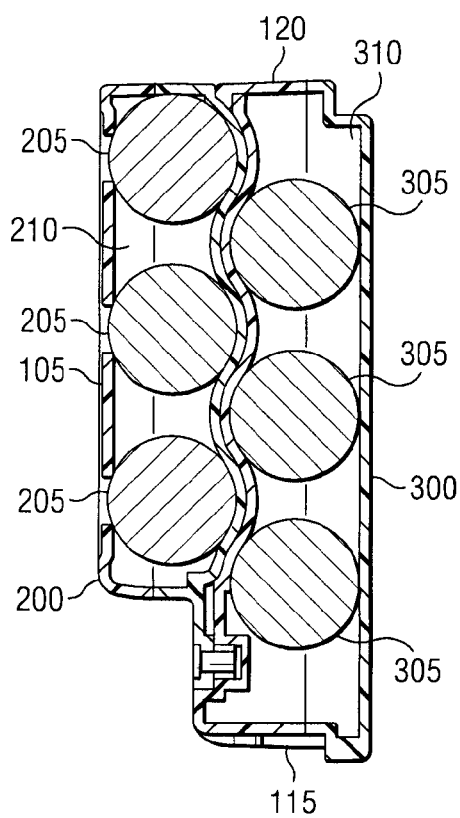

FIG. 4A is a top plan view of battery assembly 100 showing the top 105 of upper battery subassembly 200. The left side 110 of battery assembly 100 is shown in FIG. 4B while the front side 115 and rear side 120 of battery assembly 100 are shown in FIG. 4C and 4D respectively. To more clearly illustrate how battery subassemblies 200 and 300 fit together, cross sections are taken of battery assembly 100 along section lines 4E-4E and 4F-4F. FIG. 4E shows a cross section of battery assembly 100 taken along section line 4E-4E and FIG. 4F shows a cross section of battery assembly 100 taken along section line 4F-4F.

Figure 4F:
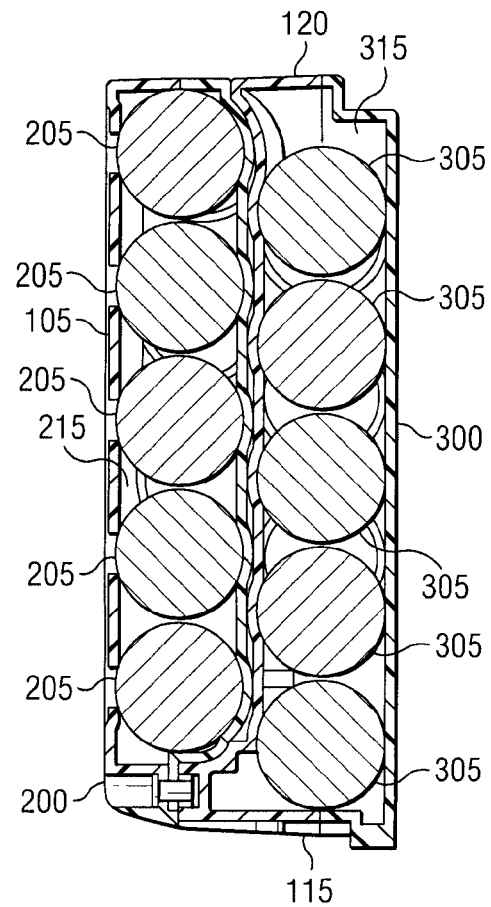

As seen in the cross sections of FIG. 4E and 4F, upper battery subassembly 200 includes 8 cells 205 and lower battery subassembly 300 includes 8 cells 305. In this particular embodiment, the cells of upper battery subassembly 200 are electrically coupled together in series such that the voltage of the cells is cumulative. When lithium ion chemistry is used for the 8 cells 205 in upper battery subassembly 305 the cumulative voltage is approximately 33.6 volts. In this particular embodiment, the cells of lower battery subassembly 300 are also electrically coupled together in series such that the cumulative voltage of the cells is 33.6 volts. When upper battery subassembly 200 is mechanically mated with lower battery subassembly 300, the connection is made in parallel such that the voltage of the combined assembly is still 33.6 volts. Those skilled in the art will appreciate that internal to subassemblies 200 and 300, the cells may be connected in series, in parallel or in a combination of series and parallel according to the output voltage and current rating desired for the combined structure. While in this embodiment, upper battery subassembly 200 is connected in parallel with lower battery subassembly 300, other embodiments are possible wherein these structures are connected in series.

In more detail, upper battery subassembly 200 includes chambers 210 and 215. In this particular embodiment, chamber 210 exhibits a first size which accommodates 3 cells and chamber 215 exhibits a second size which is larger than chamber 210 and which accommodates 5 cells therein. Other embodiments are possible wherein the chambers are configured to enclose a greater or lesser number of cells. Immediately below battery subassembly 200, lower battery subassembly 300 includes chambers 310 and 315 which correspond to chambers 210 and 215 which were already described. Chambers 310 and 315 include 3 and 5 cells, respectively, although again chambers with a greater or lesser number of cells are possible.

As mentioned earlier, upper battery subassembly 200 and lower battery subassembly are both mechanically and electrically connected together. The two subassemblies are mechanically connected together as follows. Upper battery subassembly 200 includes a lower surface 220 which mates with the upper surface 320 of lower battery assembly 300 as seen in the side view of FIG. 4B. Whatever geometric pattern selected for lower surface 220, the inverse pattern is selected for upper surface 320 so that one mates with the other. In the particular embodiment of FIG. 4B wherein lower surface 220 exhibits 3 valleys 225 it is seen that upper surface 320 exhibits 3 peaks 325. The peaks mate with the valleys and help hold upper battery subassembly 200 and lower battery subassembly 200 laterally in position with respect to one another.

Lower battery subassembly 300 includes recesses 330, seen in FIG. 3 and later in FIG. 5A-5B, into which corresponding protrusions 230 of upper battery subassembly 200 fit. Once upper battery subassembly 200 is mated with lower battery subassembly 300, screws 235 seen in FIG. 4A are threaded through threaded holes 237 in upper battery subassembly 200 and through corresponding respective threaded holes 337 seen in FIG. 3 in lower battery assembly 300 therebelow. This screw arrangement, together with the above described mating valleys 225 and peaks 325, and together with the mating protrusions 230 and recesses 330, firmly holds upper battery subassembly 200 to lower battery subassembly 300 together to form a unitary battery module. Lower battery assembly 300 also includes latches 340 to help hold battery assembly 100 together inside a battery powered device. Recesses 330 and protrusions 230 are examples of battery subassembly coupling members. Screws 235, threaded holes 237, and threaded holes 337 are examples of battery subassembly securing members.

Figure 5A:
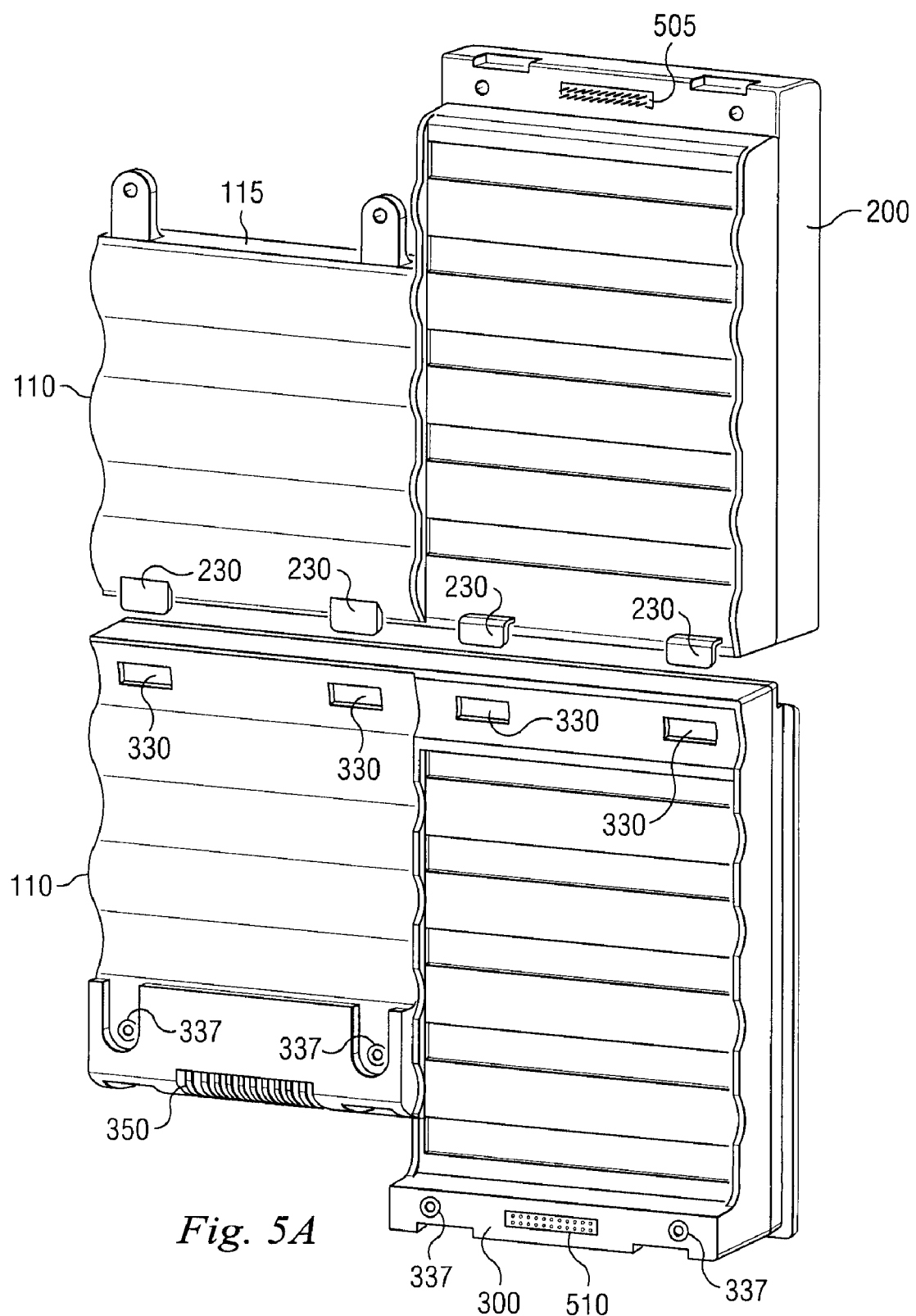
FIG. 5A and 5B are perspective views illustrating an embodiment of the battery assembly in open and partially closed positions, respectively.
Figure 5B:
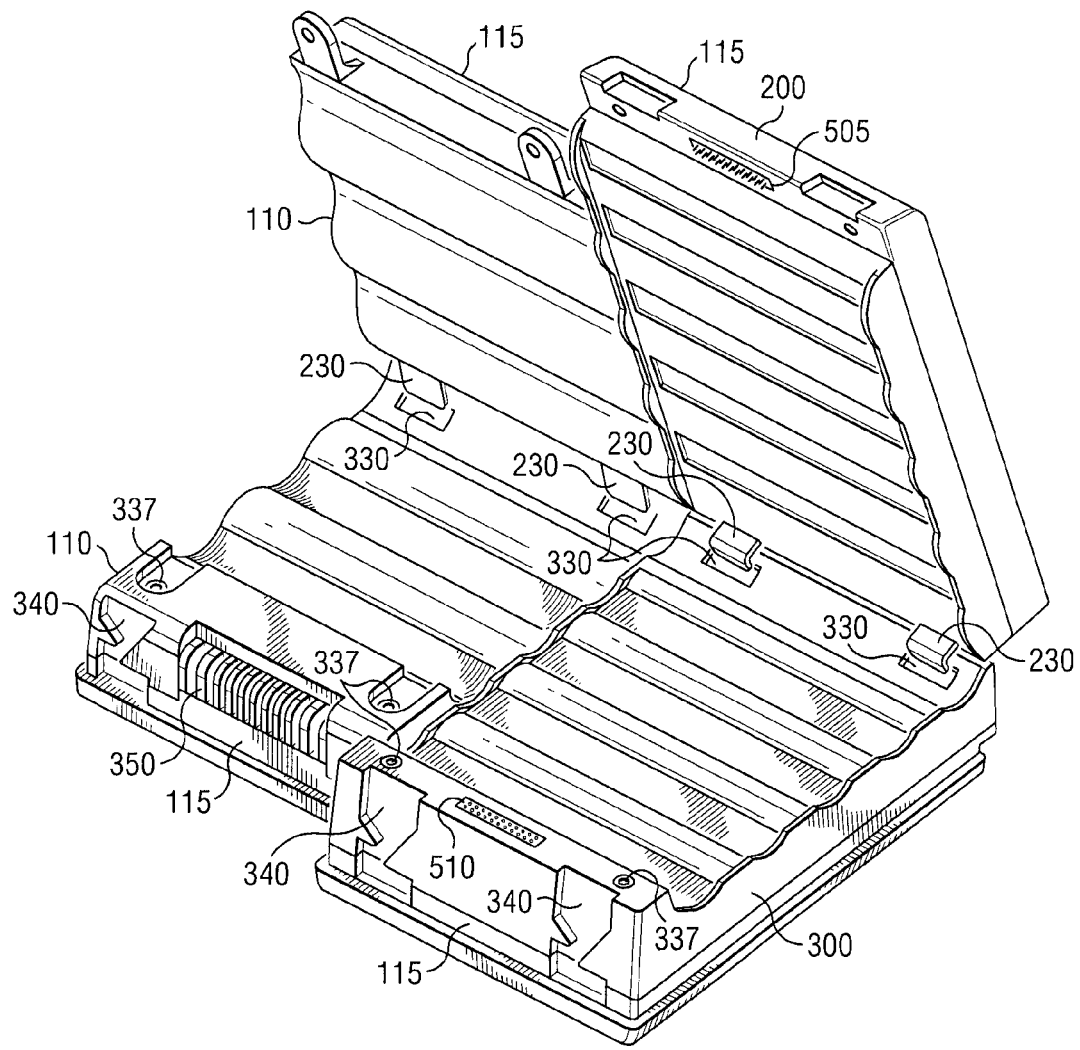

FIG. 5A is a perspective view of battery assembly 100 showing battery subassemblies 200 and 300 in an open position before being mated together. FIG. 5B is a perspective view of battery assembly 100 showing battery subassemblies 200 and 300 in a partially closed position prior to complete mating of the two subassemblies together. When protrusions 230 of upper battery subassembly 200 are situated in recesses 330 of lower battery subassembly 300 as shown in FIG. 5B the protrusion 230—recess 330 pairs form respective hinges about which upper battery subassembly 200 and lower battery subassembly 300 rotate while the are mated with one another to from completed battery assembly 100.

While the mechanical connection of upper battery subassembly 200 to lower battery subassembly 300 has been described above, the electrical connection of these two subassemblies together is now described. As seen in FIGS. 5A and 5B, upper battery subassembly 200 includes a battery connector 505 which mates and electrically connects with a battery connector 510 on lower battery subassembly 300. The cells of upper battery subassembly 200 are connected in parallel with the cells of lower battery subassembly 300 in this particular embodiment. Other embodiments are contemplated wherein the cells are connected in series as desired for the particular application. Lower battery subassembly 300 includes main power connector 350 as seen in FIGS. 5A and 5B. Main power connector 350 is used to connect the completed battery assembly 100 to other devices such as IHSs and other power consuming devices. Main power connector 350 includes multiple contacts such as positive, negative, ground as well as control signal contacts for a battery management unit (not shown) which may be situated in either of, or both of, upper battery subassembly 200 and lower battery subassembly 300. It is also possible to locate main power connector 350 in upper battery subassembly 200 if desired.

Figure 6:
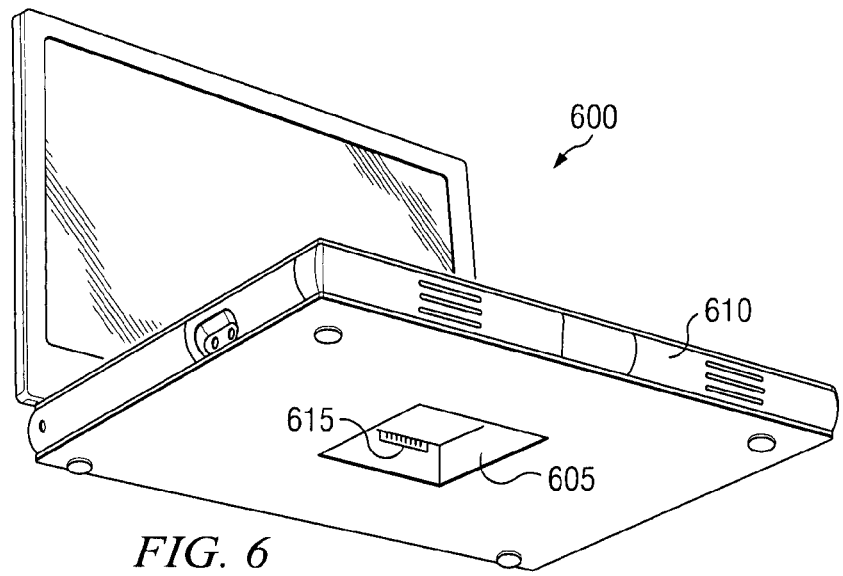
FIG. 6 is a perspective view illustrating an embodiment of a portable IHS showing a bay for receiving a battery assembly.

In one embodiment, after battery subassemblies 200 and 300 are connected together to form the completed battery assembly 100, battery assembly 100 is placed in a battery chamber or battery bay 605 formed in the housing 610 of an battery powered device 600 such as a notebook computer type IHS, for example, as shown in FIG. 6. Battery bay 605 includes an electrical connector 615, as seen in FIG. 6, which mates with main electrical connector 350 of lower battery subassembly 300 seen in FIG. 3.

Figure 7:
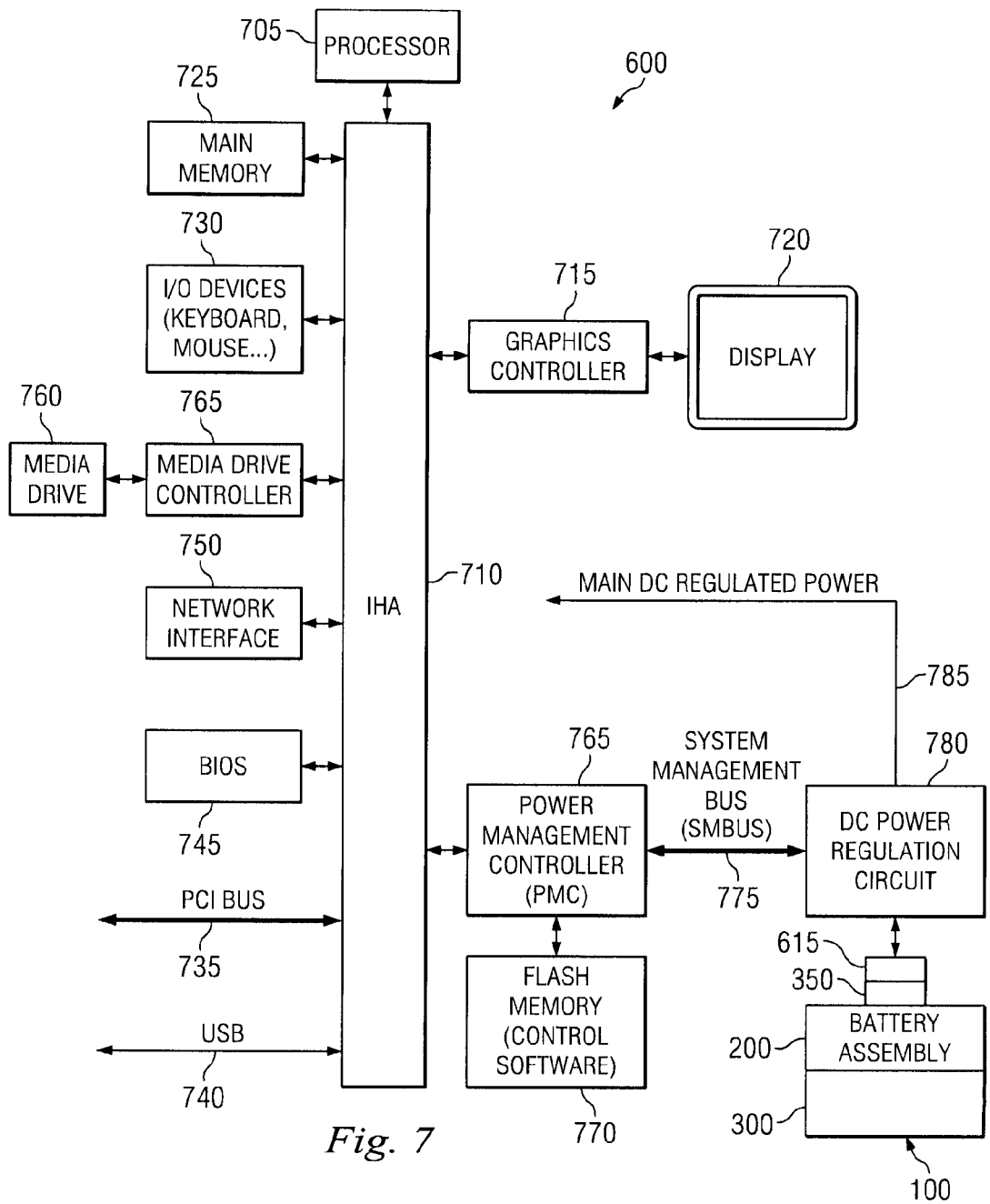
FIG. 7 is a block diagram illustrating an embodiment of the an IHS using the disclosed battery technology.

FIG. 7 is a representation of an electrical power consuming device 600 to which battery assembly 100 can be connected to supply power thereto. In this particular embodiment, electrical power consuming device 600 is an IHS such as a laptop or notebook computer. However, virtually any power consuming device can be adapted to receive power from battery assembly 100. Power consuming devices such as battery powered appliances, consumer electronics goods, electric cars, and toys are just a few examples of battery powered devices in which battery assembly 100 can be employed.

In more detail, FIG. 7 is a block diagram of a portable or notebook IHS system such as a notebook, laptop, PDA or other portable, battery-powered system. IHS 600 includes a processor 705 such as an Intel Pentium series processor or one of many other processors currently available. An Intel Hub Architecture (IHA) chipset 710 provides IHS 600 with gluelogic that connects processor 705 to other components of IHS 600. Chipset 710 carries out graphics/memory controller hub functions and I/O functions. More specifically, chipset 710 acts as a host controller which communicates with a graphics controller 715 coupled thereto. Graphics controller 715 is coupled to a display 720. Chipset 710 also acts as a controller for main memory 725 which is coupled thereto. Chipset 710 further acts as an I/O controller hub (ICH) which performs I/O functions. Input devices 730 such as a mouse, keyboard, and tablet, are also coupled to chipset 710 at the option of the user. An expansion bus 735, such as a Peripheral Component Interconnect (PCI) bus, PCI Express bus, SATA bus or other bus is coupled to chipset 710 as shown to enable IHS 600 to be connected to other devices which provide IHS 600 with additional functionality. A universal serial bus (USB) 740 or other I/O bus is coupled to chipset 710 to facilitate the connection of peripheral devices to IHS 600. System basic inputoutput system (BIOS) 745 is coupled to chipset 710 as shown. BIOS software 745 is stored in nonvolatile memory such as CMOS or FLASH memory. A network interface controller (NIC) 750 is coupled to chipset 710 to facilitate connection of system 600 to other IHSs. A media drive controller 755 is coupled to chipset 710 so that devices such as media drive 760 can be connected to chipset 710 and processor 705. Devices that can be coupled to media drive controller 755 include CD-ROM drives, DVD drives, hard disk drives and other fixed or removable media drives. IHS 600 includes an operating system which is stored on media drive 760. Typical operating systems which can be stored on media drive 760 include Microsoft Windows XP, Microsoft Windows 2000 and the Linux operating systems. (Microsoft and Windows are trademarks of Microsoft Corporation.)

IHS 600 includes a power management controller (PMC) 765 which is coupled to chipset 710 as shown. PMC 765 controls power supply functions within IHS 600 under the direction of control software stored in nonvolatile FLASH memory 770. One output of PMC 765 is a system management bus (SMBUS) 775 which is coupled to DC power regulation circuit 780. Battery assembly 100, including upper battery 200 and lower battery subassembly 300 are connected via electrical connectors 350 and 615 to DC power regulation circuit to provide a source of DC power. DC power regulation circuit 780 includes an output 785 which provides the main DC regulation power for the components of IHS 600 or other electrical power consuming device.

Figure 8:
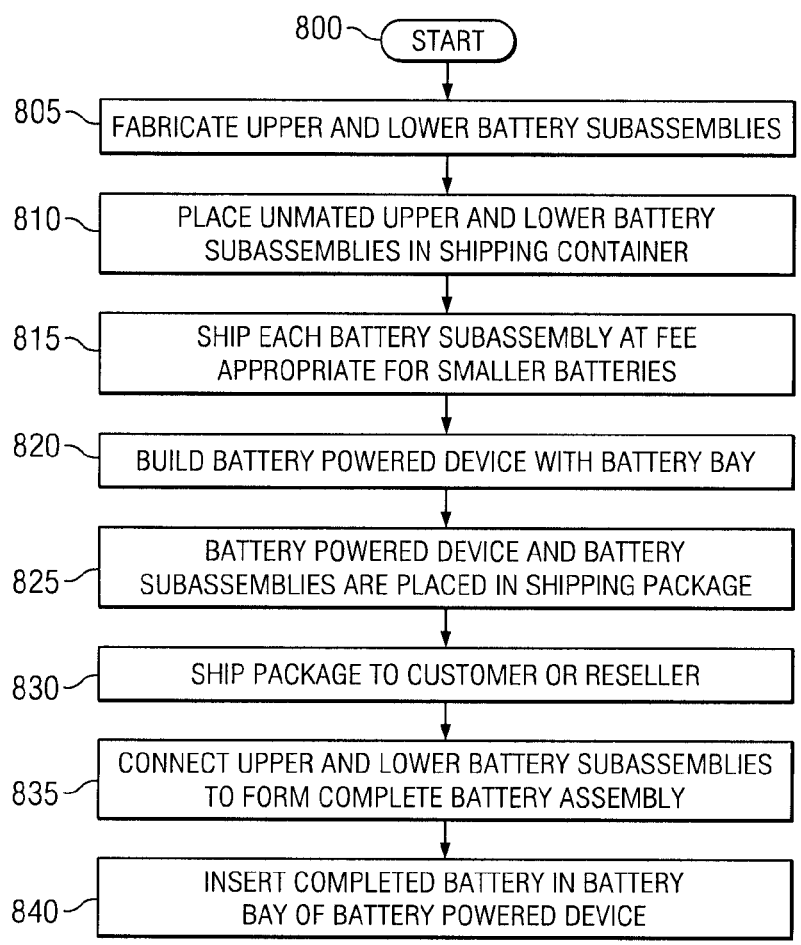
FIG. 8 is a flow chart illustrating an embodiment steps taken to fabricate and ship the battery subassemblies and assemble the completed battery assembly.

FIG. 8 is a flowchart illustrating the building process for a battery powered device utilizing battery assembly 100. Prior to shipment of a battery 100, the battery is portioned into 2 or more subassemblies which can be later mechanically and electrically connected to one another after shipping. In one embodiment, upper and lower battery subassemblies are fabricated as per block 805. In one embodiment, each battery subassembly exhibits a power rating, chemical weight or other factor which is less than a threshold amount needed to trigger increased shipping cost due to regulations or shipping liability concerns. When a battery exhibits a characteristic which exceeds a regulatory or other threshold the cost of shipping goes up. This characteristic could be the watt hour rating, the weight of a chemical element or other battery characteristic. Other embodiments using more than two battery subassemblies are possible as long as the battery subassemblies mechanically mate with one another and electrically connect to one another. The unmated upper and lower battery subassemblies are placed in a shipping container as per block 810. Each battery is then shipped at a fee per battery subassembly which is less then the increased fee encountered by batteries which exceed the regulatory threshold or other threshold as per block 815. A battery powered device, such as a notebook IHS for example, is then fabricated to include a battery receiving bay or chamber as per block 820. The IHS and the still separate upper and lower battery subassemblies are placed in a shipping package as per block 825. The package is then sent to the customer or reseller and the appropriate shipping fee is paid as per block 830. The shipping fee is at the reduced rate for smaller batteries that do not trigger the threshold for increased shipping fees. When the customer, reseller or other person receives the package, the customer, reseller or other person mechanically and electrically connects the upper and lower battery assemblies to form a complete battery assembly as per block 835. The complete battery is then placed in the battery bay of the IHS device as per block 840. The complete battery assembly is mechanically and electrically connected to the IHS device to provide power thereto. In one embodiment, an IHS configuration facility or reseller or other entity may connect the upper and lower battery assemblies to complete the battery assembly and then place the battery assembly in the battery bay of an electrically powered device. In this embodiment, the customer would pick up the completed electrically powered device from the configuration facility, the reseller or other entity.

It is noted that an IHS is just one example of a battery powered device to which the disclosed technology applies. The disclosed technology can be applied to fabricate and ship a battery which can be used in virtually any battery powered device. In one embodiment, the chemistry of the individual battery subassemblies is the same. For example, the upper battery subassembly and the lower battery subassembly each employ nickel metal hydride chemistry. Alternatively, both subassemblies employ lithium ion or nickel cadmium chemistry or other battery chemistries. In another embodiment the battery subassemblies employ different chemistries. For example, one battery subassembly employs lithium ion chemistry and the other mating battery subassembly employs nickel metal hydride chemistry. In this embodiment, the lithium ion battery subassembly includes a battery management unit, safety controls and housing appropriate for lithium ion chemistry and the nickel metal hydride battery subassembly includes a battery management unit, safety controls and housing appropriate for nickel metal hydride chemistry.

Advantageously, the disclosed technology allows a customer to upgrade the battery used in the customer's battery powered device. Initially the customer can purchase just one battery subassembly to power the device. Later the customer can, at his or her convenience, purchase a second battery subassembly. The customer then mates the first battery subassembly with the second battery subassembly to form a battery which exhibits increased power and energy capacity.

The disclosed technology advantageously partitions a battery into multiple battery subassemblies resulting in substantial savings when batteries are shipped from place to place. The terms "upper" and "lower" as applied to upper battery subassembly 200 and lower battery subassembly 300 are used for convenience and are not intended to limit the battery subassemblies to these particular orientations. Likewise, terms such as top, bottom, front and rear are also used for convenience and are not intended to limit elements of battery assembly 100 to a particular orientation.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of shipping a battery assembly comprising:
providing a first battery subassembly that houses a plurality of first battery cells and includes a first battery subassembly outer mating surface, wherein at least one first battery subassembly coupling member is located adjacent a first side of the first battery subassembly outer mating surface, at least one first battery subassembly securing member is located adjacent a second side of the first battery subassembly outer mating surface that is opposite the first battery subassembly outer mating surface from the first side of the first battery subassembly outer mating surface, and at least one first battery subassembly electrical connector is located adjacent the first battery subassembly outer mating surface;
providing a second battery subassembly that houses a plurality of second battery cells and includes a second battery subassembly outer mating surface, wherein at least one second battery subassembly coupling member is located adjacent a first side of the second battery subassembly outer mating surface, at least one second battery subassembly securing member is located adjacent a second side of the second battery subassembly outer mating surface that is opposite the second battery subassembly outer mating surface from the first side of the second battery subassembly outer mating surface, and at least one second battery subassembly electrical connector is located adjacent the second battery subassembly outer mating surface;
shipping the first battery subassembly and the second battery subassembly such that an additional shipping fee is not incurred, wherein the additional shipping fee is based on a battery characteristic that is not the total weight of a battery assembly that includes the first battery subassembly and the second battery subassembly;
coupling the first battery subassembly and the second battery subassembly together to form the battery assembly by coupling the at least one second battery subassembly coupling member to the at least one first battery subassembly coupling member to form a rotatable coupling, then rotating the second battery subassembly relative to the first battery subassembly about the rotatable coupling, wherein the rotating results in the first battery subassembly outer mating surface being located immediately adjacent the second battery subassembly outer mating surface, the at least one first battery subassembly electrical connector mating with the at least one second battery subassembly electrical connector, and the at least one second battery subassembly securing member being located adjacent the at least one first battery subassembly securing member; and
securing the at least one second battery subassembly securing member to the at least one first battery subassembly securing member such that the first battery subassembly outer mating surface is secured in position relative to the second battery subassembly outer mating surface.

2. The method of claim 1, wherein the first subassembly outer mating surface includes a first geometric pattern, and wherein the second battery subassembly outer mating surface includes a second geometric pattern that is inverse to the first geometric pattern.

3. The method of claim 1, further comprising positioning the battery assembly in a battery powered device, at which time the first battery subassembly is secured to the second battery subassembly with at least one latch included in the battery assembly.

4. The method of claim 1, wherein the at least one first battery subassembly coupling member includes at least one recess defined by the first battery subassembly, and wherein the at least one second battery subassembly coupling member includes a protrusion having an arcuate shape, extending from the second battery subassembly, and operable to be inserted into the at least one recess to form the rotatable coupling between the first battery subassembly and the second battery subassembly.

5. The method of claim 1, wherein the shipping comprises shipping the first battery subassembly and the second battery subassembly to an information handling system (IHS) assembly facility, and wherein the IHS assembly facility performs the coupling of the first battery subassembly to the second battery subassembly to form the battery assembly.

6. The method of claim 1, wherein the shipping comprises shipping the first battery subassembly and the second battery subassembly to an IHS user, and wherein the IHS user performs the coupling of the first battery subassembly to the second battery subassembly to form the battery assembly.

7. The method of claim 1, wherein the battery characteristic that is not based on the weight of the battery assembly comprises a watt-hour rating of the battery assembly.

8. The method of claim 1, wherein the battery characteristic that is not based on the weight of the battery assembly comprises a chemical mass in the battery assembly.

9. The method of claim 8, wherein the chemical mass in the battery assembly comprises a lithium ion chemical mass in the battery assembly.

10. A method for powering an information handling system (IHS) comprising:
providing a first battery subassembly that houses a plurality of first battery cells and includes a first battery subassembly outer mating surface, wherein at least one first battery subassembly coupling member is located adjacent a first side of the first battery subassembly outer mating surface, at least one first battery subassembly securing member is located adjacent a second side of the first battery subassembly outer mating surface that is opposite the first battery subassembly outer mating surface from the first side of the first battery subassembly outer mating surface, and at least one first battery subassembly electrical connector is located adjacent the first battery subassembly outer mating surface;
providing a second battery subassembly that houses a plurality of second battery cells and includes a second battery subassembly outer mating surface, wherein at least one second battery subassembly coupling member is located adjacent a first side of the second battery subassembly outer mating surface, at least one second battery subassembly securing member is located adjacent a second side of the second battery subassembly outer mating surface that is opposite the second battery subassembly outer mating surface from the first side of the second battery subassembly outer mating surface, and at least one second battery subassembly electrical connector is located adjacent the second battery subassembly outer mating surface;

shipping the first battery subassembly and the second battery subassembly such that an additional shipping fee is not incurred, wherein the additional shipping fee is based on a battery characteristic that is not the total weight of a battery assembly that includes the first battery subassembly and the second battery subassembly;

coupling the first battery subassembly to the second battery subassembly to form the battery assembly by coupling the at least one second battery subassembly coupling member to the at least one first battery subassembly coupling member to form a rotatable coupling, then rotating the second battery subassembly relative to the first battery subassembly about the rotatable coupling, wherein the rotating results in the first battery subassembly outer mating surface being located immediately adjacent the second battery subassembly outer mating surface, the at least one first battery subassembly electrical connector mating with the at least one second battery subassembly electrical connector, and the at least one second battery subassembly securing member being located adjacent the at least one first battery subassembly securing member;

securing the at least one second battery subassembly securing member to the at least one first battery subassembly securing member such that the first battery subassembly outer mating surface is secured in position relative to the second battery subassembly outer mating surface; and coupling the battery assembly to an IHS that includes a processor and a memory coupled to the processor such that power may be provided to the processor and the memory from the plurality of first battery cells and the plurality of second battery cells.

11. The method of claim 10, wherein the first subassembly outer mating surface includes a first geometric pattern, and wherein the second battery subassembly outer mating surface includes a second geometric pattern that is inverse to the first geometric pattern.

12. The method of claim 10, wherein the battery assembly includes at least one latch that is operable to secure the first battery subassembly to the second battery subassembly.

13. The method of claim 10, wherein the at least one first battery subassembly coupling member includes at least one recess defined by the first battery subassembly, and wherein the at least one second battery subassembly coupling member includes a protrusion having an arcuate shape, extending from the second battery subassembly, and operable to be inserted into the at least one recess to form the rotatable coupling between the first battery subassembly and the second battery subassembly.

14. The method of claim 10, wherein the shipping comprises shipping the first battery subassembly and the second battery subassembly to an IHS user, and wherein the coupling is performed by the IHS user.

15. The method of claim 10, wherein the shipping comprises shipping the first battery subassembly and the second battery subassembly to an IHS facility, and wherein the coupling is performed by the IHS facility.

16. The method of claim 10, wherein the battery characteristic that is not based on the weight of the battery assembly comprises a chemical mass in the battery assembly.

17. The method of claim 16, wherein the chemical mass in the battery assembly is a lithium ion chemical mass.

18. The method of claim 16, wherein the chemical mass in the battery assembly is nickel metal hydride chemical mass.

19. The method of claim 10, wherein the battery characteristic that is not based on the weight of the battery assembly comprises a watt-hour rating of the battery assembly.

* * * * *